April 4, 1961 P. E. BARNES 2,977,984
SERVO SOLENOID VALVE
Filed June 15, 1960
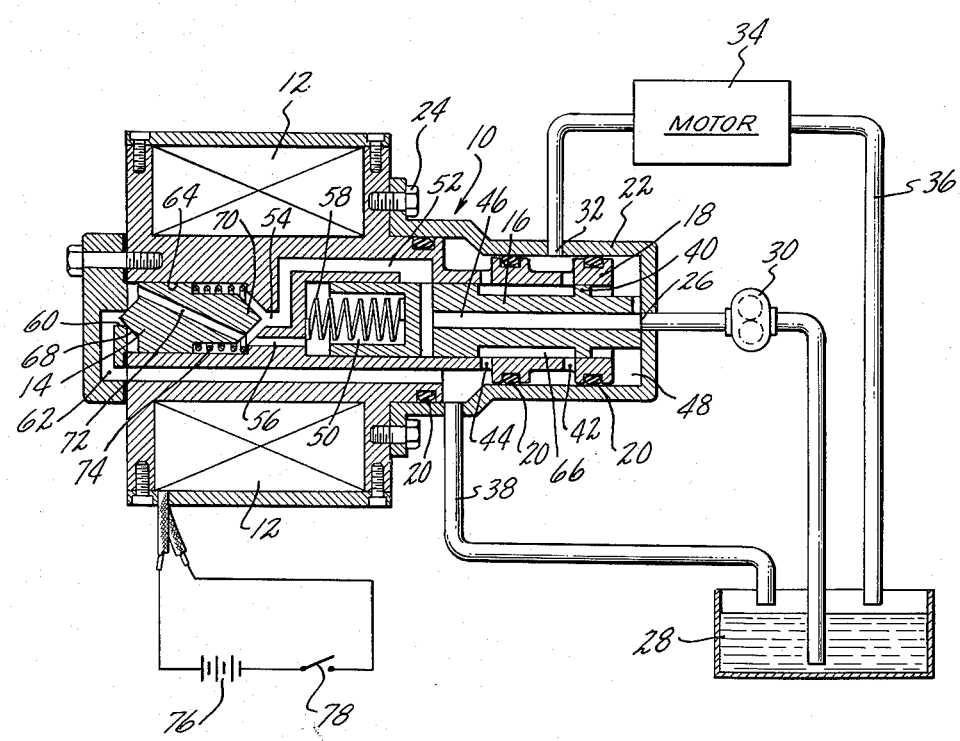
INVENTOR
PHILIP E. BARNES
BY *Harris G. Luther*
ATTORNEY

United States Patent Office 2,977,984
Patented Apr. 4, 1961

2,977,984

SERVO SOLENOID VALVE

Philip E. Barnes, North Granby, Conn., assignor to United Aircraft Corporation, East Hartford, Conn., a corporation of Delaware Filed June 15, 1960, Ser. No. 36,405

11 Claims. (Cl. 137—623)

This invention relates to valve mechanism and particularly to unitary compact electrically controlled servo valve mechanism.

An object of this invention is a small, light solenoid actuated servo valve package.

A further object is a reliable valve unit with improved flow capabilities.

Other objects and advantages will be appreciated from the following specification and the accompanying drawing in which:

The single figure is a longitudinal cross section of the assembled valve with the operating connections schematically shown.

In servo valve mechanisms the pilot valve and its operating mechanism are often separate entities requiring separate operating connections resulting a heavy bulky device and even when combined do not present the compact light reliable mechanism of the present invention.

As shown in the drawings the valve mechanism is a compact package contained in a housing indicated generally at 10, and comprises three principal elements, namely: an actuating coil or solenoid 12, a pilot valve 14, and a servo valve 16. As shown, the portion 18 of the housing is provided with seals 20 which may be O ring seals so that the valve assembly may be readily inserted into or removed from an auxiliary housing 22. The auxiliary housing 22 may be part of a larger piece of mechanism and this construction permits the ready removal and replacement of the valve mechanism as a unit. The valve unit may be held in the auxiliary housing 22 by any suitable means such as the screws 24. Housing 22 is supplied with a pressure supply connection 26, adapted to receive pressure fluid from a reservoir 28 and a pump 30, which may be actuated by any suitable means, not shown. Housing 22 is also provided with a pressure outlet 32 which may be connected with any desired motor 34. The motor 34 may have its own drain 36 or may rely on draining back through the valve. Housing 22 is also supplied with a drain connection 38, which may lead back to the reservoir 28.

Servo valve 16 is a spool type of valve having a land 40 which may be moved from one side to the other of a port 42 to selectively connect the pressure outlet 32 with the pressure supply 26 or with the drain connection 38. The drain connection is made through the port 44, which is continuously connected with the drain connection 38. A pressure line connects the chamber 48 at one end of the spool valve 16 with the chamber 50 at the other end of the spool valve and comprises a channel 46 extending longitudinally through the spool valve from one end to a radially extending passage adjacent to the other end. The radial passage connects with a channel 52 in the housing portion 18, and has an orifice 54 between the channel 52 and the channel 56 leading to the chamber 50. A spring 58 urges the spool valve 16 to the right. The housing portion 18 has a drain orifice 60 continuously open to the drain connection 38 through a drain line 62 in housing 18.

The pilot valve or plunger 14 is arranged for axial movement in a bore 64 axially aligned with the bore 66 in which servo valve 16 is axially moveable. Plunger 14 has a needle or poppet valve 68 formed on one end and a similar valve 70 formed on the other end. A passage 72 connects the opposite ends of the pilot valve or plunger 14. A spring 74 urges the plunger 14 to the left. The coil 12 may be energized by any suitable means which are schematically shown as a battery 76 controlled by a switch 78.

When the plunger 14 is in the left hand position valve 68 blocks orifice 60 and when the valve is in the right hand position valve 70 blocks orifice 54.

When the solenoid 12 is deenergized plunger 14 is urged to the left by spring 74 to close orifice 60 and block drain line 62. Supply pressure is admitted to the chamber 48 at one end of the servo valve and through passages 46, 52, the small supply orifice 54, and passage 56 to the chamber 50 at the other end of the servo valve. With the pressure equal on both ends of the servo valve, the spring 58 holds the servo valve 16 in the closed position, as shown in the drawing, and the controlled chamber, or motor 34, is vented to drain 38 by the position of the land 40 on the servo valve. The solenoid plunger 14 is held in the left hand position, as shown in the sketch, by the plunger return spring 74 and by the unbalanced pressure on the right hand end of the plunger over an area equal to the area of the orifice 60.

When the solenoid 12 is energized, the solenoid armature force overcomes the combined force of the plunger return spring 74 and the unbalanced pressure force acting over an area equal to that of the drain orifice 60, and the plunger shifts to the right, thus opening the drain orifice 60 and closing the supply orifice 54. The servo pressure chamber 50 is thus opened to drain through the passage 72 and the drain orifice 60 and the resulting pressure unbalance on the servo valve 16 overcomes the servo return spring 58 causing the servo valve 16 to shift to the open position in which the port 42 is connected directly with the chamber 48 and the supply connection 26, as the land 40 has moved to the left of the port 42.

The unbalanced forces on the plunger 14 are determined by the size of the drain and supply orifices 60 and 54 respectively. When the plunger is in the left hand position as shown in the sketch, the orifice 60 determines the amount of unbalanced pressure, and when the valve is in the right hand position pressure is supplied only to an area the size of the orifice 54, the remainder of the surfaces being connected to drain through the passage 72 and the open orifice 60. With a given solenoid size, this unbalance limits the size of the orifices so as to limit the unbalance to one which may be overcome by the solenoid. In a small compact valve, this will limit the pilot valve or plunger 14 to a low flow capacity.

In the device chosen to explain this invention, an unbalanced, short stroke, two-way poppet type valve with relatively high inherent reliability, but low flow capacity due to the pressure unbalance across the flow orifice has been combined with a hydraulically operated slide type servo valve capable of handling relatively high flow with low pressure losses, but subject to jamming. However, due to the hydraulic pressure actuation, relatively large forces are available to shift the servo valve, thus maintaining a high overall reliability of the system. By combining these two functions in one unit, a compact, light-weight solenoid has been produced with relatively high reliability and capable of handling relatively large flows.

I claim:

1. In combination a ported valve housing having a longitudinally extending chamber, a longitudinally movable valve member in said chamber cooperating with said ports, said member and housing having passages connecting opposite ends of said valve member for simultaneously admitting pressure fluid to both ends of said member, a control plunger longitudinally movable in said chamber, having two active positions, spring means moving said plunger to one position and magnetic means moving said plunger to the other position, said plunger having means blocking said passage to one end of said member and connecting said one end with drain when said plunger is in said one position, and in the other position blocking said drain, opening said passage and connecting both ends of said plunger with said pressure fluid.

2. A magnetically actuated longitudinally movable plunger located adjacent one end of a servo valve mounted in the same housing as said plunger, a drain orifice adjacent one end of said plunger, means on one end of said plunger for blocking said orifice, when the plunger is moved in one direction, means at the other end of said plunger for blocking a pressure connection to said other end when said plunger is moved in the other direction, means connecting said other end and a chamber at one end of said servo valve, a passage through said plunger for connecting said chamber with said one end of said plunger when said plunger is in position to block the pressure connection to said chamber.

3. In combination with a pressure actuated servo valve having a housing and means including a pressure line connecting opposite ends of said servo valve for balancing the pressure on opposite sides of said valve and spring means for closing said valve when said pressure is balanced, a short stroke plunger in said housing and having a poppet valve on each end and a passage connecting opposite ends of said plunger, closure means including an orifice in said pressure line located adjacent one end of said plunger in position to be closed by one said poppet valve, a drain orifice in said housing adjacent the other end of said plunger in position to be closed by the other said poppet valve, electrically actuated plunger moving means for moving said plunger to close said pressure line orifice and open said drain orifice and spring means moving said plunger to close said drain orifice and open said pressure line orifice, said passage balancing the pressure on opposite side of said plunger when the pressure orifice is open and connecting one end of said servo valve with drain when said pressure orifice is closed.

4. In combination, a valve housing having a pressure supply connection, a controlled pressure outlet connection and a drain connection, a servo valve in said housing controlling said outlet and having one end open to said supply connection, a pressure line, including a series orifice, connecting the other end of said servo valve with said supply connection, a pilot valve in said housing having a valve connected with one end and adapted to close said orifice and block said pressure line, a drain line connected with said drain connection and having an orifice adjacent the other end of said pilot valve, a valve connected with said pilot valve other end and adapted to close said drain orifice, a passage connecting the opposite ends of said pilot valve, and electrically energized means for moving said pilot valve from one orifice closing position to the other.

5. A combination as claimed in claim 4 in which the pressure line includes a chamber at one end of said plunger with said orifice discharging into said chamber and also includes passage means connecting said chamber with said other end of said servo valve.

6. In combination a valve housing having a pressure supply connection, a controlled pressure outlet connection and a drain connection, a pressure actuated servo valve controlling said outlet connection and having an active surface open to said supply connected to move said servo in one direction, spring means moving said servo in the opposite direction, a pilot valve in said housing, means continuously connecting both ends of said pilot valve with one end of said servo valve, and means controlled by movement of said pilot valve selectively connecting said ends with said pressure supply connection or said drain connection.

7. A combination as claimed in claim 6 including spring means urging said plunger in one direction and electrical means for urging said plunger in the opposite direction.

8. In combination a valve housing having a pressure supply connection, a controlled pressure outlet connection and a drain connection, a pressure actuated servo valve controlling said outlet and a pilot valve in said housing, one end of said servo valve being open to said pressure supply connection, spring means for moving said valves, and separating them, means, including a pressure line connecting said one end with the other end of said servo and with one end of said pilot valve and a line connecting opposite ends of said pilot valve, equalizing the pressure on the opposite ends of said two valves when separated, means, including magnetic means and pressure actuated means, forcing said valves toward each other, and means, including means controlled by said pilot valve, blocking said pressure line, and connecting both ends of said pilot valve and said other end of said servo valve with drain when said valves are forced toward each other.

9. In combination, a valve housing having a pressure supply connection, a controlled outlet connection and a drain connection, a servo valve and a pilot valve in said housing, spring means for separating said valves, means connecting both ends of both valves with said pressure supply when separated, means, including magnetic means, urging said valves toward each other to an adjacent position, and means, controlled by said pilot valve, blocking said pressure supply to one end of said servo and both ends of said pilot valve when said valves are in said adjacent position.

10. A combination as claimed in claim 9 including means controlled by said pilot valve connecting said one end of said servo valve and both ends of said pilot valve with drain when said valves are in said adjacent position.

11. A unitary valve structure comprising a housing having pressure inlet, pressure outlet and drain connections, a spool valve movable longitudinally in said housing to control said outlet connection and having one end open to said inlet connection, spring means urging said valve towards said one end, a pilot valve longitudinally slideable in a chamber substantially axially aligned with said spool valve in said housing, said chamber having a fluid connection with the other end of said spool valve, a drain orifice and a pressure orifice, of small flow capacity relative to said connections, connected with said drain connection and said pressure inlet connection respectively and opening into said chamber and controlled by said pilot valve to selectively connect said orifices with said other end of said spool valve, a spring urging said pilot valve in one direction and a solenoid coil surrounding said valves to move said pilot valve in the other direction.

No references cited.